US006348954B1

(12) United States Patent
Takishima et al.

(10) Patent No.: US 6,348,954 B1
(45) Date of Patent: Feb. 19, 2002

(54) OPTIMUM MOTION VECTOR DETERMINATOR AND VIDEO CODING APPARATUS USING THE SAME

(75) Inventors: Yasuhiro Takishima; Shigeyuki Sakazawa, both of Tokyo; Masahiro Wada, Kanagawa, all of (JP)

(73) Assignee: KDD Corporation, Tokyo (JP)

( * ) Notice: Subject to any disclaimer, the term of this patent is extended or adjusted under 35 U.S.C. 154(b) by 0 days.

(21) Appl. No.: 09/255,188

(22) Filed: Feb. 22, 1999

(30) Foreign Application Priority Data

Mar. 3, 1998 (JP) ............................................. 10-067861

(51) Int. Cl.$^7$ .............................. H04N 7/36; H04N 7/50
(52) U.S. Cl. ................................... 348/699; 375/240.16
(58) Field of Search ...................... 348/699; 375/240.24, 375/240.12; H04N 7/36, 7/50

(56) References Cited

U.S. PATENT DOCUMENTS 6,249,550 B1 * 6/2001 Mizuno et al. ........ 375/240.24

FOREIGN PATENT DOCUMENTS

JP 63-181585 7/1988 .......... H04N/7/137

* cited by examiner

*Primary Examiner*—Howard Britton
(74) *Attorney, Agent, or Firm*—Westman, Champlin & Kelly, P.A.

(57) ABSTRACT

A motion vector candidate selector selects candidate motion vectors for a MB to be coded based on the allowable calculation amount supplied from a controller. A predictive motion vector determinator determines an optimum predictive motion vector from among the candidate motion vectors. A statistical amount measuring unit determines the variance of motion vectors from among the motion vectors already determined. A search area determinator determines the size of the search area based on the allowable calculation amount. Also, a predictive motion vector periphery searcher determines the shape of the search area from the variance of the motion vectors, sets the size of the shape to the value determined by the search area determinator, and with the optimum predictive motion vector as an origin, searches the search area. An optimum motion vector is determined from among the motion vectors thus searched. The above-described configuration can provide a video coding apparatus capable of detecting an optimum motion vector with high accuracy with a small calculation amount.

7 Claims, 8 Drawing Sheets

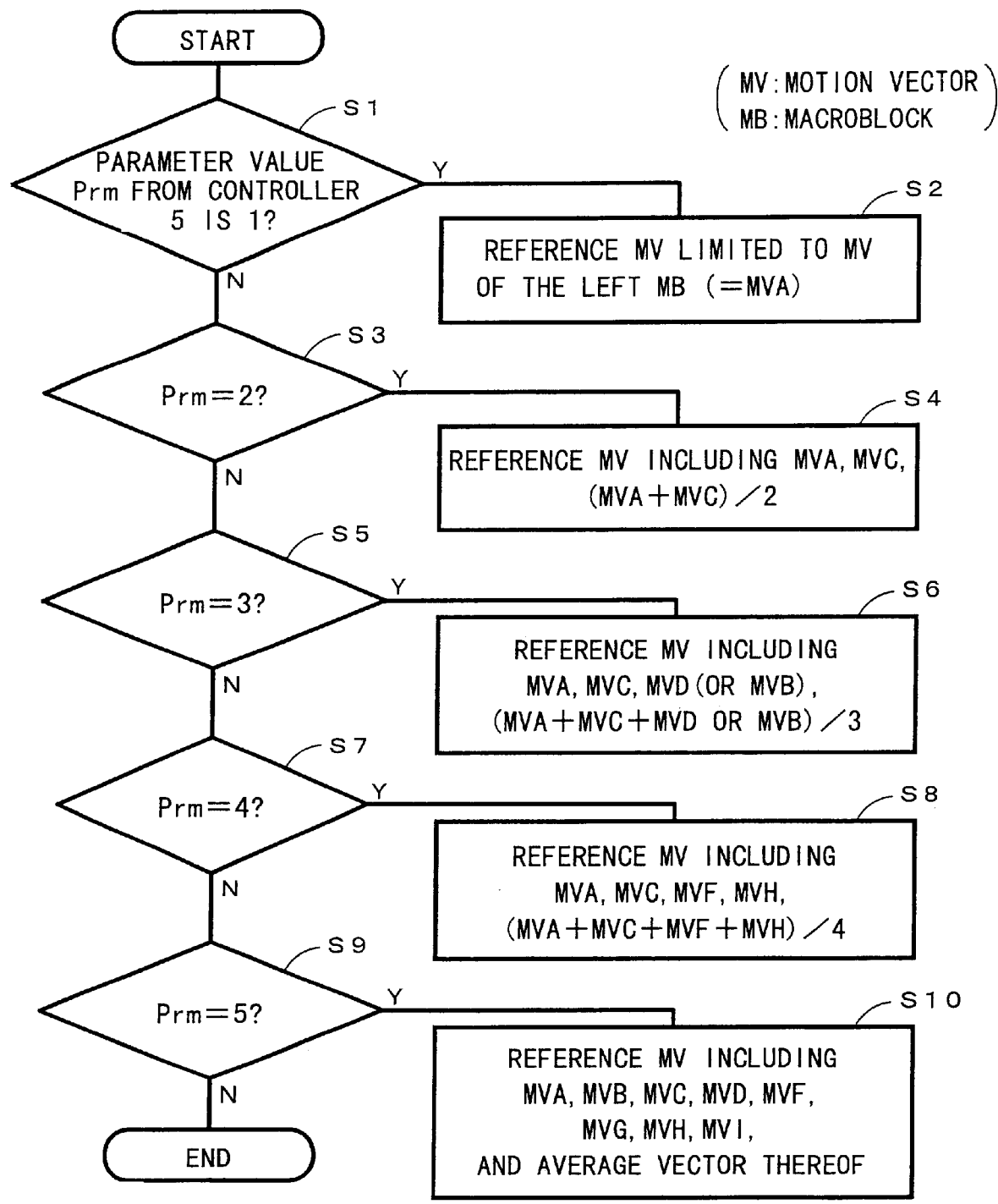

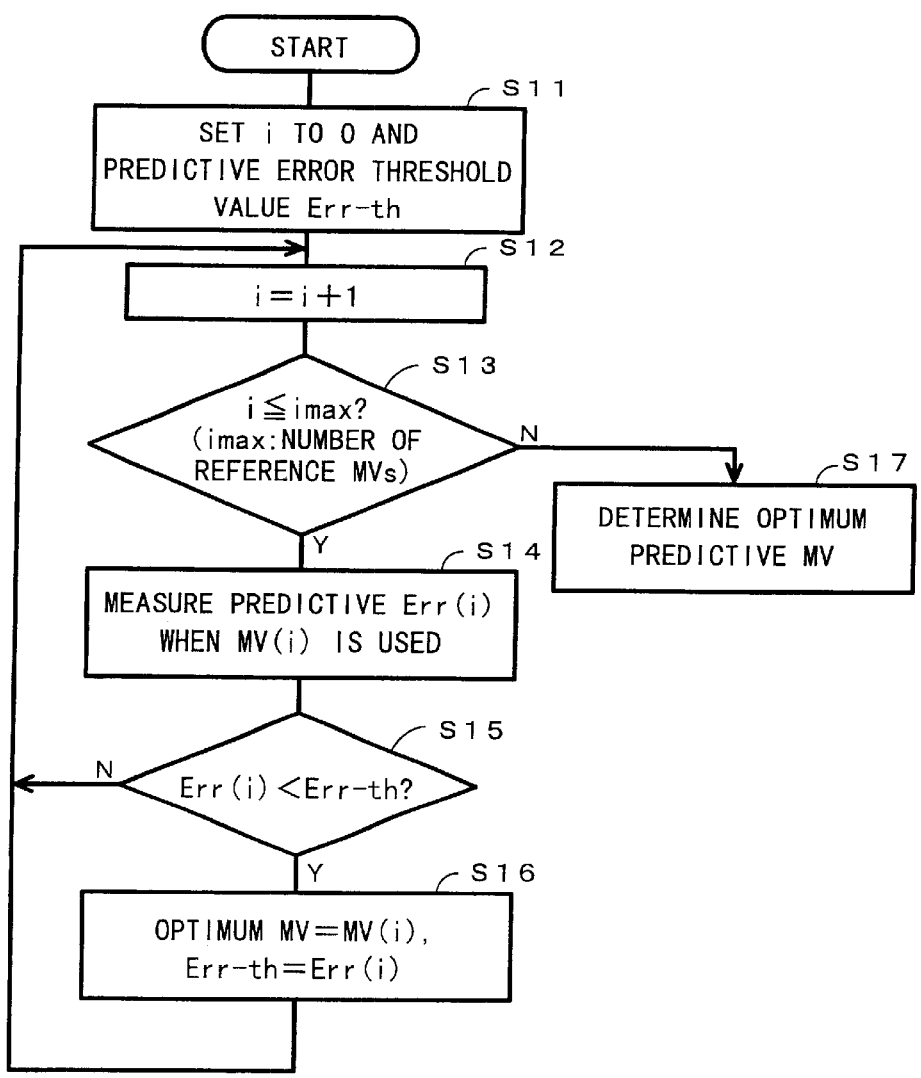

MOBILE & CALENDER

FLOWER GARDEN

☆ MB TO BE CODED

OPTIMUM MOTION VECTOR DETERMINATOR AND VIDEO CODING APPARATUS USING THE SAME

BACKGROUND OF THE INVENTION

1. Field of the Invention

The present invention relates to a video coding apparatus capable of highly efficient motion compensation prediction.

2. Description of the Related Art

Conventionally, a video coding apparatus for coding video data is widely known. FIG. 11 is a block diagram showing an example of the conventional video coding apparatus. As shown in FIG. 11, the video coding apparatus comprises a subtractor 51 for generating a predictive error signal by subtracting a predictive image data from an original image data, an orthogonal transformer 52 for orthogonal transformation or, for example, DCT transformation of the predictive error signal output from the subtractor 51, a quantizer 53 for quantizing the orthogonally transformed data, and a variable-length coder 54 for variable-length coding the quantized data. The apparatus further comprises an inverse quantizer 55 for inversely quantizing the data quantized by the quantizer 53, an inverse orthogonal transformer 56, an adder 57, a frame memory 58 for storing a reproduced image temporarily, a motion compensation predictor 59 for performing motion compensation with the original image data and the reproduced image data from the frame memory 58, and a controller 60 for controlling the operation of the various parts described above.

In this video coding apparatus, the search for an optimum motion vector by the motion compensation predictor 59 has a considerable effect on the coding efficiency. Conventionally, there has been generally employed the full search method for comprehensively searching all portions around the motion vector selected as a candidate for a portion to be referred as a method for searching an optimum motion vector. This total search method has a high accuracy of acquiring an optimum motion vector, but requires a vast amount of arithmetic operations leading to the problem of a very large size of the circuit for realizing it.

In view of this, another method has been proposed in which a motion vector selected by the macroblock coded immediately before a macroblock to be coded is used as an initial candidate, and only the vectors in the vicinity thereof are searched as search candidates.

In this conventional method, however, in the case that signal properties are much different between the macroblock to be coded and the macroblock coded immediately before, for example, in the case that these two macroblocks are image portions representing different objects, for lack of the correlationship between the optimum motion vectors of both macroblocks, the accuracy of detecting an optimum motion vector for the macroblock to be coded is so reduced as to deteriorate the coding efficiency. Also, the search area in this method is considerably reduced as compared with the search area in the total search method described above. The shape of search area, however, is generally a square similar to that in the total search method, which gives rise to the problem that wasteful calculations are performed in search of an optimum motion vector.

SUMMARY OF THE INVENTION

The object of the present invention is to provide a video coding apparatus capable of highly accurate detection of an optimum motion vector with a small calculation amount.

To attain the above object, this invention is characterized in that an optimum motion vector determination apparatus comprises motion vector candidate selection means for selecting candidates of motion vectors at the portion to be coded, predictive motion vector determination means for determining an optimum predictive motion vector from among the candidate motion vectors, variation calculation means for determining the degree of variance of motion vectors in the image based on the motion vectors already determined, means for determining the search shape of the motion vectors based on the degree of distribution and means for searching the motion vectors in the search shape from using the predictive motion vector determined by the predictive motion vector determination means as an origin of search and determining an optimum motion vector among the motion vectors searched.

According to this aspect, an optimum predictive motion vector is determined from among motion vector candidates for the portion to be coded, and further, with the predictive motion vector as an origin of search, the interior of the search shape determined according to the previously-determined degree of motion vector variances is searched to determine an optimum motion vector.

Therefore, as compared with the conventional method in which the adjacent motion vector immediately to the left of the portion to be coded is considered an optimum motion vector, the reliability can be increased considerably without much increase in the amount of calculation.

BRIEF DESCRIPTION OF THE DRAWINGS

FIG. 3 is a flowchart for explaining the operation of the motion vector candidate selector shown in FIG. 1.

FIG. 4 is a diagram showing the relationship between a macroblock involved and macroblocks on the periphery thereof.

FIG. 5 is a flowchart for explaining the operation of a predictive motion vector determinator in FIG. 1.

DETAILED DESCRIPTION OF THE PREFERRED EMBODIMENTS

Figure 2:
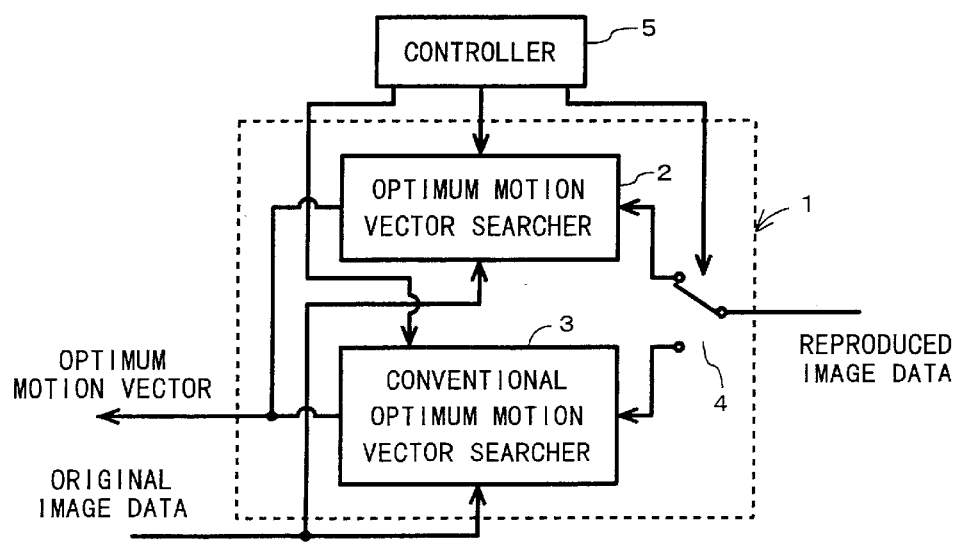
FIG. 2 is a block diagram showing an apparatus which is used being switched between the apparatus of the present invention and the conventional apparatus.
Figure 11:
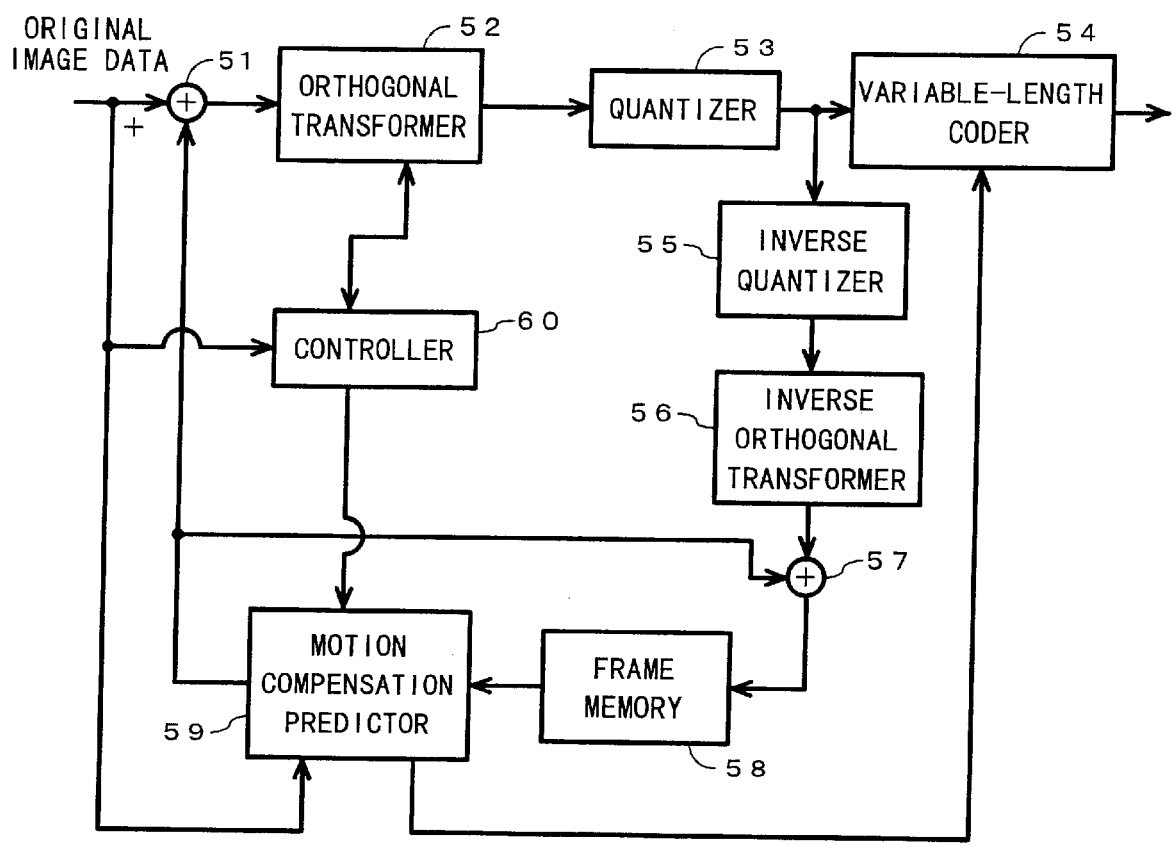
FIG. 11 is a block diagram showing a configuration of the conventional coding apparatus.

The present invention will be explained in detail with reference to the drawings. FIG. 2 is a block diagram schematically showing the essential parts of the invention, which shows a configuration corresponding to the optimum motion vector searchers in the motion compensation predictor 59 and the controller 60 in FIG. 11. The optimum motion vector searcher 1 is composed of an optimum motion vector searchers 2 according to the present invention, a conventional optimum motion vector searcher 3, and a selector 4 for selecting one of the optimum motion vector searchers 2, 3 based on the command from a controller 5. The conventional optimum motion vector searcher 3 is assumed to be of a system to determine an optimum motion vector by total search, for example. In the case that the commands from the controller 5 are in one-to-one relation, the selector 4 switches the two searchers alternately for each macroblock. In the case that the relation is n-to-1 (n: positive integer), the optimum motion vector searcher 2 according to the present invention is selected for n macroblocks, and the conventional motion vector searcher 3 is selected for one macroblock.

Figure 1:
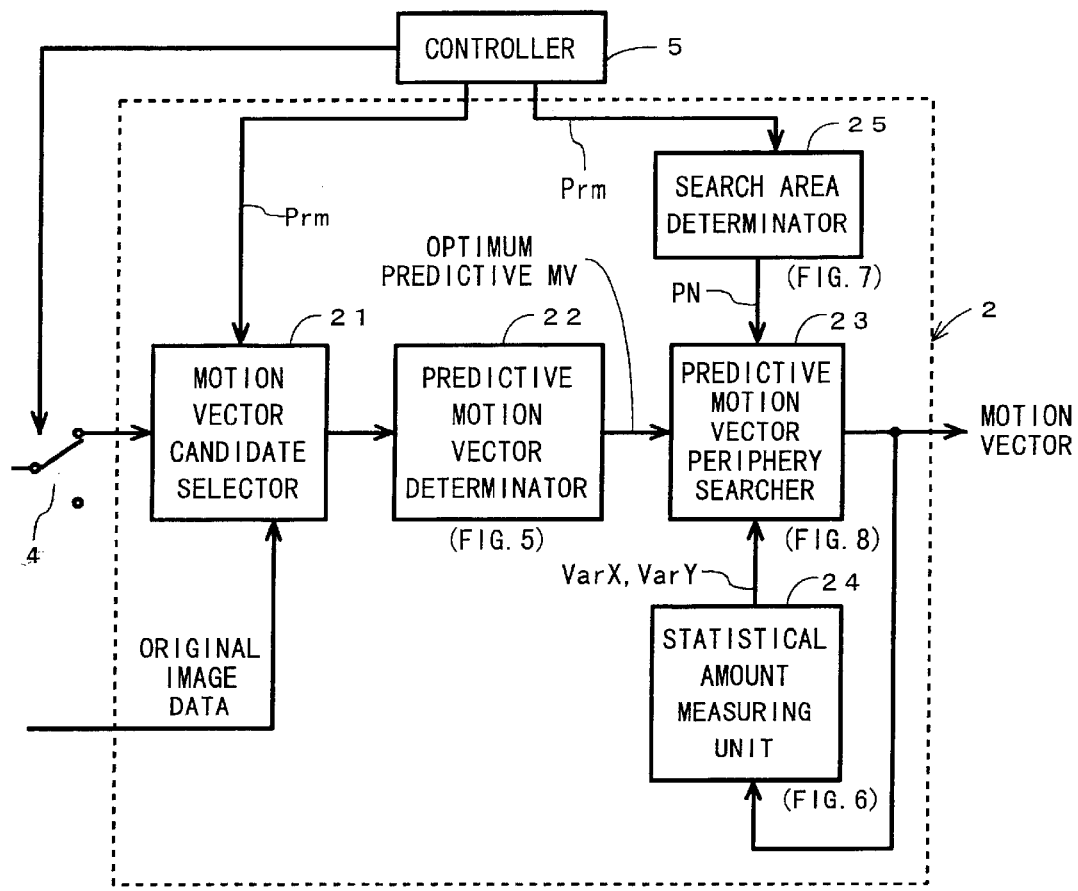
FIG. 1 is a block diagram showing an embodiment of the present invention.

FIG. 1 is a block diagram showing a configuration of the optimum motion vector searcher 2 according to an embodiment of the present invention. The optimum motion vector searcher 2 is composed of a motion vector candidate selector 21 for selecting motion vector candidates based on the parameter value Prm supplied from the controller 5, a predictive motion vector determinator 22 for determining an optimum predictive motion vector from among the motion vector candidates selected by the motion vector candidate selector 21, and a predictive motion vector periphery searcher 23 for determining a search shape based on the distribution values VarX, VarY of the motion vectors from the statistical amount measuring unit 24, determining the size of the search shape based on the search area supplied from a search area determinator 25, and checking all the motion vectors within the search area having the search shape and the size described above using the optimum predictive motion vector acquired from the predictive motion vector determinator 22 as an origin of the search to determine an optimum motion vector.

Now, the operation of the motion vector candidate selector 21, the predictive motion vector determinator 22, the statistical amount measuring unit 24, the search area determinator 25 and the predictive motion vector periphery searcher 23 will be explained sequentially with reference to FIGS. 3 to 8.

First, the operation of the motion vector candidate selector 21 will be explained with reference to FIGS. 3 and 4. FIG. 3 is a flowchart, and FIG. 4 is a diagram for explaining a macroblock MB (hereinafter, referred to simply as the MB) to be coded and the macroblocks on the periphery thereof.

An allowable calculation amount parameter value Prm is output from the controller 5 to the motion vector candidate selector 21. In step S1, it is determined whether the allowable calculation amount parameter value Prm is 1. In the case that the determination is affirmative, the process proceeds to step S2, where only one motion vector MV(=MVA) of the adjacent macroblock immediately to the left of the MB is selected as a reference motion vector MV (hereinafter, referred to as the reference MV). In the case that in step S3 it is determined that the allowable calculation amount parameter value Prm is 2, the process proceeds to step S4, where the motion vectors MVA, MVC and (MVA+MVC)/2 of the adjacent macroblocks MB immediately to the left and immediately above the MB are selected as reference MVs. Also, in the case that in step S5 it is determined that the allowable calculation amount parameter value Prm is 3, the process proceeds to step S6, where the motion vectors MVA, MVC, MVD (or MVB) and (MVA+MVC+MVD or MVB)/3 of the adjacent macroblocks MB immediately to the left of, immediately above and immediately right above (or left above) the MB are selected as reference MVs. Further, in the case that in step S7 it is determined that the allowable calculation amount parameter value Prm is 4, the process proceeds to step S8, where the motion vectors MVA, MVC, MVF, MVH and (MVA+MVC+MVF+MVH)/4 of the macroblocks shown in FIG. 4 are selected as reference MVs. Further, in the case that in step S9 it is determined that the allowable calculation amount parameter value Prm is 5, the process proceeds to step S10 where the motion vectors MVA, MVB, MVC, MVD, MVF, MVG, MVH, MVI and an average vector thereof of the macroblocks shown in FIG. 4 are selected as reference MVs.

Now, the operation of the predictive motion vector determinator 22 will be explained with reference to the flowchart of FIG. 5. In step S11, a value i is set to 0 and a predictive error threshold value Err-th is given. A sufficiently large predictive error value should be taken as the predictive error threshold value Err-th. In step S12, the numeral i is increased by one, and the process proceeds to step S13. In step S13, it is determined whether the relation i≦imax is established, where imax is the number of the reference MVs determined by the motion vector candidate selector 21.

In the case that the determination in step S13 is affirmative, the process proceeds to step S14, where the predictive error Err(1) is measured at the time when the first motion vector MV(1) is used. Then, the process proceeds to step S15, where it is determined whether the predictive error Err(1) is smaller than Err-th. Generally, this determination is affirmative and the process proceeds to step S16. In step S16, the optimum motion vector is set to MV(1) and the predictive error threshold value Err-th is updated to the predictive error Err(1). The process then returns to step S12, where the value i is increased by one to be 2. In step S13, it is determined whether i has reached at least the number of the reference MVs. In the case that i has not reached, the process proceeds to step S14, the same operations are repeated. In the case that the determination in step S15 is negative, the process returns to step S12.

In the case that the determination in step S13 is negative after repeating the above operations, when the process proceeds to step S17, where an optimum predictive motion vector MV is determined. The motion vector MV(i) determined in step S16 is used as the optimum predictive motion vector MV. The optimum predictive motion vector MV is sent to the predictive motion vector periphery searcher 23.

Figure 6:
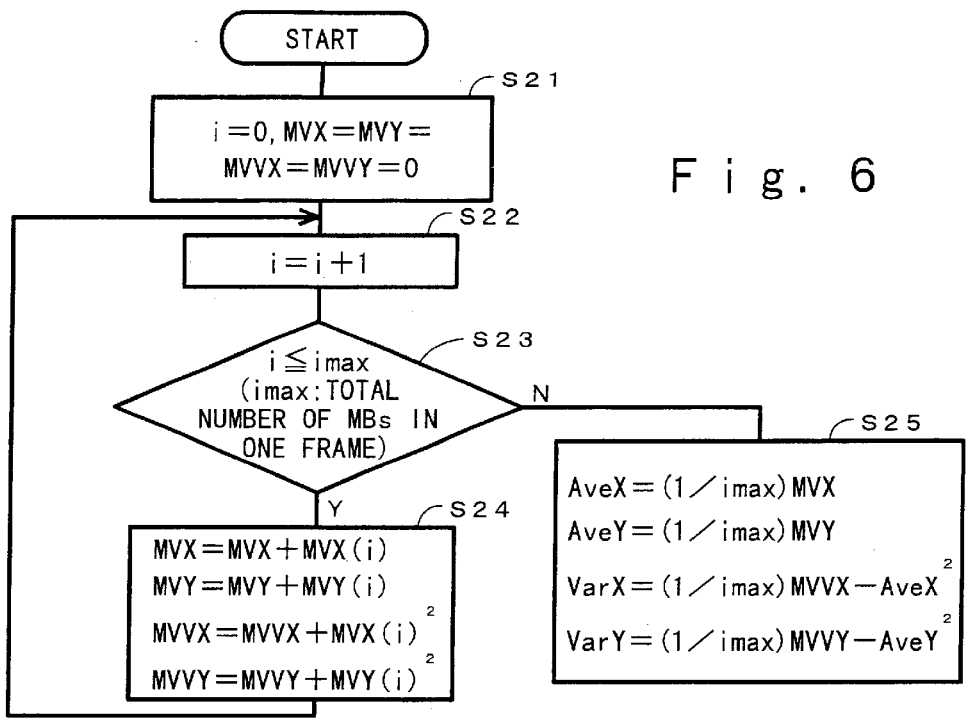
FIG. 6 is a flowchart for explaining the operation of a statistical amount measuring unit in FIG. 1.

Now, the operation of the statistical amount measuring unit 24 will be explained with reference to the flowchart of FIG. 6. The present image data is input to the statistical amount measuring unit 24. In step S21, the value i indicating the macroblock number in the image frame is set to 0, and the motion vectors MVX, MVY in X and Y directions, respectively, are also set to 0. The values MVVX and MVVY described later are also set to 0. Then, the process proceeds to step S22, where i is increased by one. In step S23, it is determined whether i≦imax is established, where imax is the total number of macroblocks MB in one frame of the image. In the case that this determination is affirmative, the process proceeds to step S24, where the motion vectors MVX, MVY in X and Y directions, respectively, of the i-th macroblock are accumulated. Also, MVVX and MVVY are respectively determined from the equations MVVX+MVX(i)$^2$ and MVVY+MVY(i)$^2$. This process is repeated, and in the case that the determination in step S23 is negative, the process proceeds to step S25, where the average motion vector AveX in X direction, the average motion vector AveY in Y direction, the motion vector variance VarX in X direction and the motion vector variance VarY in Y direction are determined from the equations shown.

The motion vector variances VarX, VarY in X and Y directions are sent to the predictive motion vector periphery searcher 23.

Figure 7:
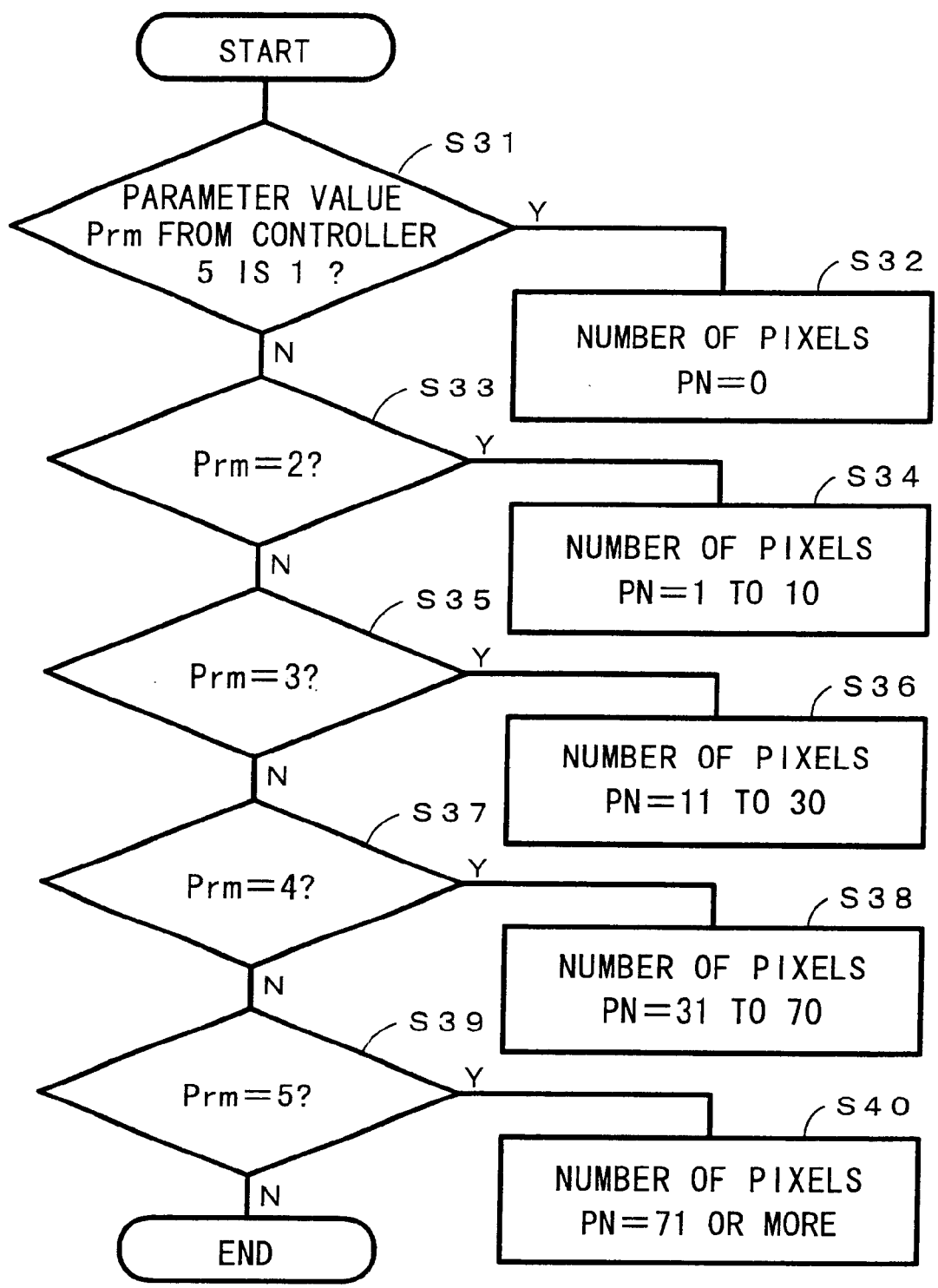
FIG. 7 is a flowchart for explaining the operation of a search area determinator in FIG. 1.

Now, the operation of the search area determinator 25 will be explained with reference to the flowchart of FIG. 7. The allowable calculation amount parameter value Prm is output from the controller 5 to the search area determinator 25. Then, the search area determinator 25 determines, in step S31, whether the allowable calculation amount parameter value Prm is 1. In the case that this determination is affirmative, the process proceeds to step S32, where the number of pixels PN constituting the search area is set to zero. In the case that in step S33 it is determined that the allowable calculation amount parameter value Prm is 2, the number of pixels PN constituting the search area is set to 1 to 10. In the same manner, in the case that the allowable calculation amount parameter values Prm are 3, 4 and 5, the number of pixels PN constituting the search area is set to 11 to 30, 31 to 70 and 71 or more, respectively. These search area ranges are one example. These numbers of pixels PN constituting the search areas are sent to the predictive motion vector periphery searcher 23.

Figure 8:
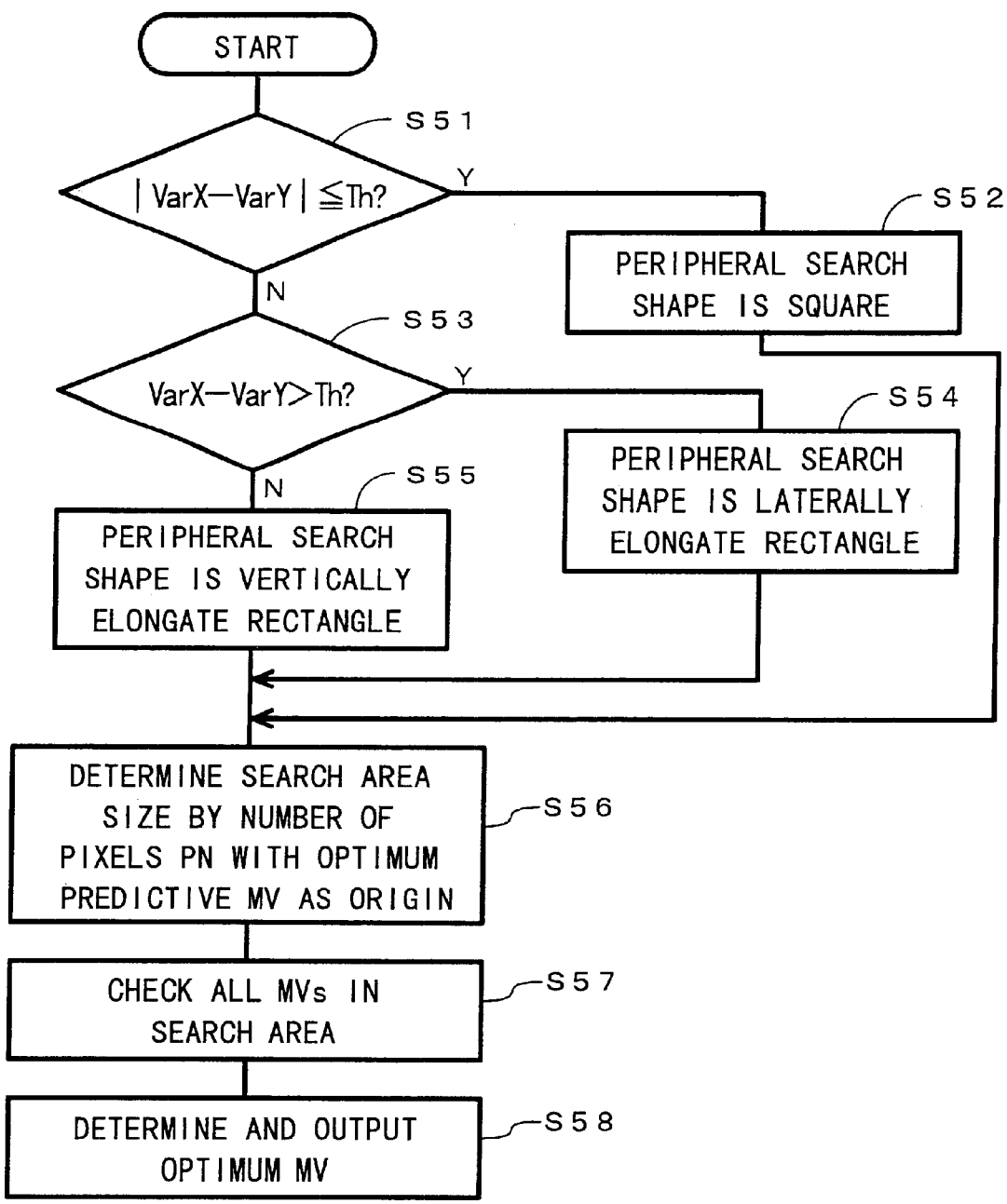
FIG. 8 is a flowchart for explaining the operation of a predictive motion vector peripheral searcher in FIG. 1.

Now, the operation of the predictive motion vector periphery searcher 23 will be explained with reference to FIG. 8. In step S51, it is determined whether the absolute value of the difference between the variances VarX and VarY of the motion vectors in X and Y directions of the one frame described above is equal to or less than a predetermined threshold value Th. In the case that this determination is affirmative, it is determined that the variations of the motion vectors in X and Y directions are substantially the same in X and Y directions. Therefore, the process proceeds to step S52, where it is determined that the peripheral search shape is a square. The shape is not limited to the square, but may be a rhombus, a polygon, a circle or the like.

In the case that the determination in step S51 is negative, the process proceeds to step S53. In step S53, it is determined whether the difference between the variance VarX of the motion vectors in X direction and the distribution VarY of the motion vectors in Y direction is larger than the threshold value Th. In the case that this determination is affirmative, the process proceeds to step S54, where it is determined that the peripheral search shape is a laterally elongate rectangle. This is because the lateral distribution of the motion vectors is considered large. On the other hand, in the case that the determination in step S53 is negative, the process proceeds to step S55, where it is determined that the peripheral search shape is a longitudinally elongate rectangle. This is because the distribution of the motion vectors in longitudinal direction is considered large. The shape is not limited to the rectangle, but may be a laterally or vertically elongate ellipse.

In step S56, the extent of the search is determined based on the number of pixels PN from the search area determinator 25 by using the optimum predictive motion vector MV obtained by the predictive motion vector determinator 22 as an origin. For example, in the case that the peripheral search shape is a laterally elongate rectangle, if the number of pixels PN is large, the area of the rectangle is larger. This is also same as the case of other peripheral search shapes.

In step S57, all the motion vectors MV in the peripheral search shape are checked. In step S58, one optimum motion vector MV is determined from all the motion vectors MV and output.

As described above, according to the present embodiment, not only the motion vector of an adjacent macroblock immediately to the left of a macroblock to be coded but also any of the motion vectors of the peripheral macroblocks and the average vector of the motion vectors is used as a reference MV, and one of them with a minimum predictive error is selected as the optimum predictive motion vector MV. Also, the search shape is determined from the variance of the motion vectors, and in accordance with the magnitude of the allowable calculation amount parameter value, the search area is determined. In spite of a small calculation amount, therefore, a motion vector with high accuracy can be detected.

Figure 9:
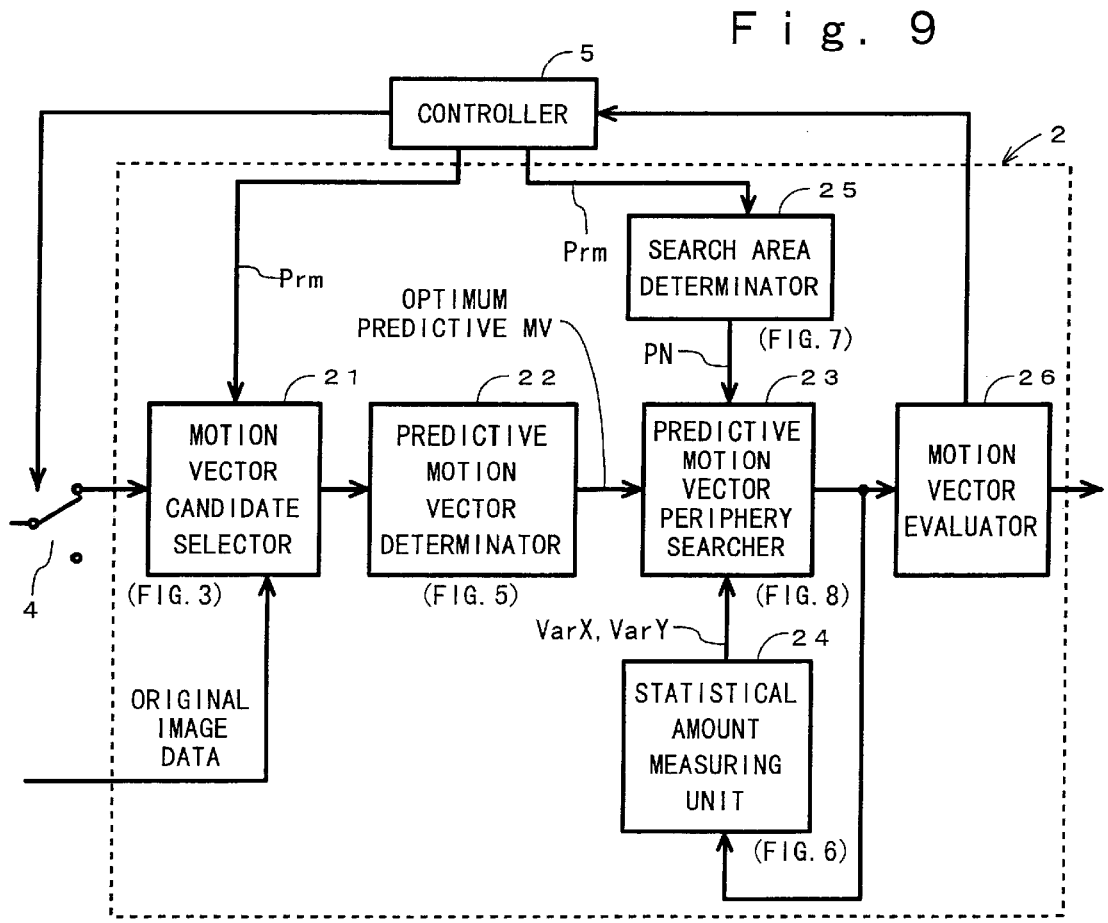
FIG. 9 is a block diagram of a second embodiment of the present invention.

Now, a second embodiment of the present invention will be explained with reference to the block diagram of FIG. 9. This embodiment, as compared with the above-described embodiment, has the characteristic in that a motion vector evaluator 26 is added to the configuration of FIG. 1. The motion vector evaluator 26 determines the sum of squares of the interframe or interfield difference signal using the optimum MV determined by the predictive motion vector periphery searcher 23, and determines whether this value is larger or smaller than a predetermined reference value. In the case that the sum of squares of the interframe or interfield difference signal is larger than the predetermined reference value, that is, in the case that the accuracy of the optimum motion vector MV is low, the controller 5 switches the selector 4 to the conventional apparatus, so that the optimum motion vector MV is again determined by the conventional method. On the other hand, in the case that the sum of squares of the interframe or interfield difference signal is equal to or less than the predetermined reference value, the optimum motion vector MV is output as it is.

According to the present embodiment, therefore, the motion vectors with low accuracy are removed so that the reliability is improved.

As apparent from the above-described description, according to the present invention, the optimum predictive motion vector is determined from among the candidate motion vectors for the portion to be coded and the search area of motion vector is determined based on the variances of the motion vectors already determined. With the optimum predictive motion vector as an origin, the search area is searched to determine an optimum motion vector. Therefore, an optimum motion vector can be accurately obtained with a small calculation amount.

Figure 10A:
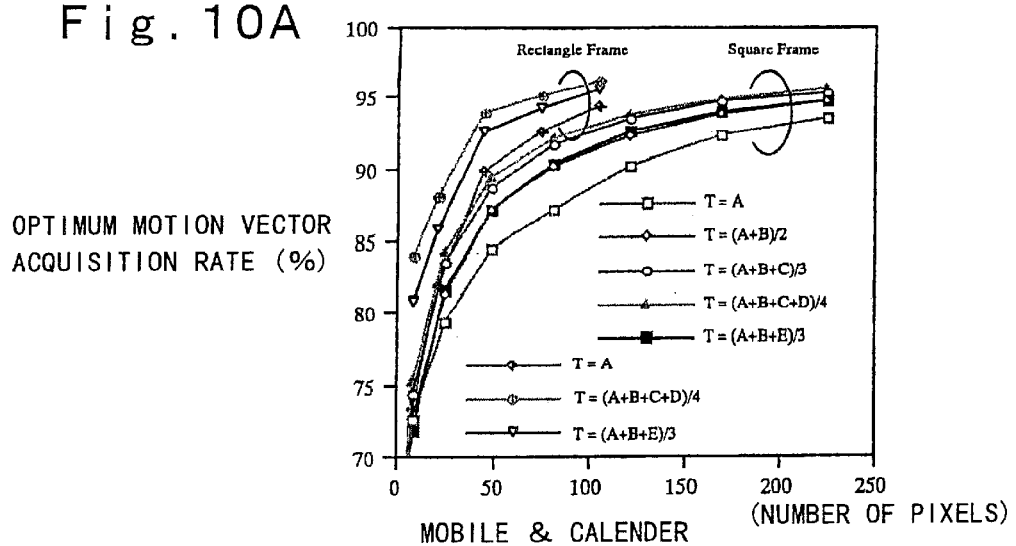
FIGS. 10A, 10B and 10C are graphs showing the result of experiments conducted according to the present invention.
Figure 10B:
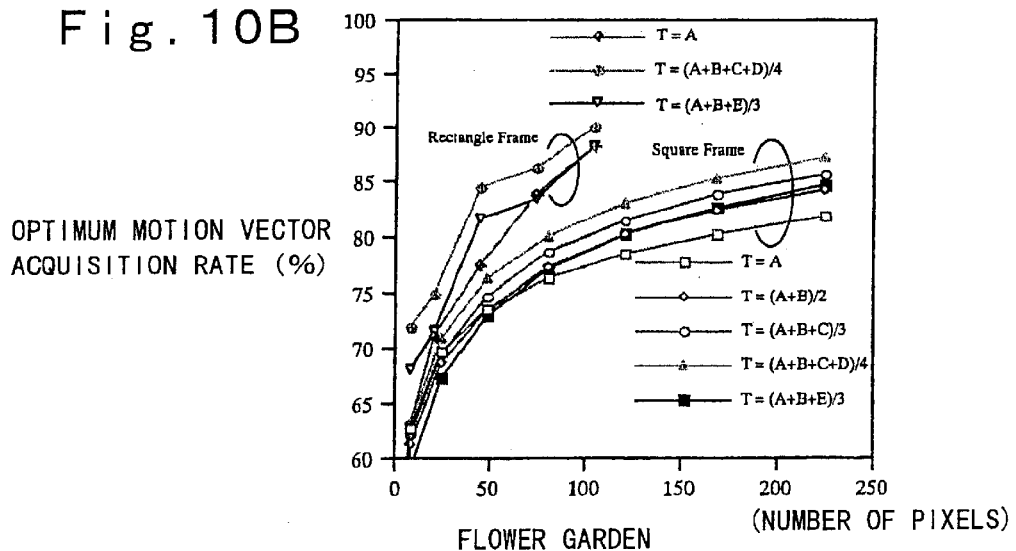
Figure 10C:
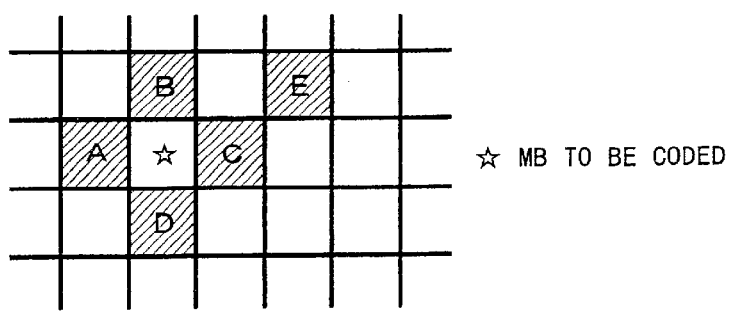

The result of the experiments conducted by the present inventors to determine the optimum motion vector with the set one-to-one switching frequency of the selector 4 is shown in FIGS. 10A and 10B. In these drawings, the abscissa represents the number of pixels searched, and the ordinate represents the acquisition rate (%) of the optimum motion vector. Also, FIG. 10A shows the case in which the Mobile & Calendar is used as an image, and FIG. 10B shows the case in which the Flower Garden is used as an image. In the diagrams, characters A to E designate the motion vectors of macroblocks in the neighborhood of the macroblock in FIG. 10C. In the diagrams, Rectangle Frame shows the case in which the search shape is a rectangle, and Square Frame shows the case in which the search shape is a square.

It is seen from FIG. 10A that in the case that the search shape is a rectangle, the probability of acquiring an optimum motion vector is equal to or more than 90% with about 25 pixels searched, and it is seen from FIG. 10B that the probability of acquiring an optimum motion vector is equal to or more than 85% with about 50 pixels.

What is claimed is:

1. An optimum motion vector determination apparatus comprising:

motion vector candidate selection means for selecting candidates of motion vectors at the portion to be coded;

predictive motion vector determination means for determining an optimum predictive motion vector from among the candidate motion vectors;

variation calculation means for determining the degree of variance of motion vectors in the image based on the motion vectors already determined;

means for determining the search shape of the motion vectors based on the degree of distribution; and means for searching the motion vectors in the search shape from using the predictive motion vector determined by the predictive motion vector determination means as an origin of search and determining an optimum motion vector among the motion vectors searched.

2. An optimum motion vector determination apparatus according to claim 1, wherein the motion vector candidate selection means determines candidates of motion vectors from among motion vectors in the neighborhood of the portion to be coded, based on a specified allowable calculation amount.

3. An optimum motion vector determination apparatus according to claim 1, wherein the predictive motion vector determination means determines an optimum predictive motion vector which is a motion vector with a minimum predictive error when the candidate motion vectors are used.

4. An optimum motion vector determination apparatus according to claim 1, wherein the means for determining the search shape of motion vectors is intended for a square when the variance of the motion vectors is equal to or less than a predetermined value and intended for an elongate rectangle when the variance is larger than the predetermined value.

5. An optimum motion vector determination apparatus according to claim 1, further comprising means for determining the area of the search shape of motion vectors based on a specified allowable calculation amount.

6. A video coding apparatus comprising a first optimum motion vector determination means obtained according to claim 1, and a second optimum motion vector determination means, wherein the first and second optimum motion vector determination means are used together.

7. The video coding apparatus according to claim 6, wherein the first optimum motion vector determination means further comprises a motion vector evaluation means for evaluating the optimum motion vector, in the case that a certain evaluation can not be obtained by the motion vector evaluation means, an optimum motion vector is obtained by the second optimum motion vector determination means.

* * * * *